(12) United States Patent
Yoon et al.

(10) Patent No.: US 12,689,725 B2
(45) Date of Patent: Jul. 21, 2026

(54) REGRESSION MODEL-BASED INTRA PREDICTION

(71) Applicant: Tencent America LLC, Palo Alto, CA (US)

(72) Inventors: Yonguk Yoon, Palo Alto, CA (US); Lien-Fei Chen, Palo Alto, CA (US); Biao Wang, San Jose, CA (US); Roman Chernyak, Santa Clara, CA (US); Motong Xu, Palo Alto, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/923,617

(22) Filed: Oct. 22, 2024

(65) Prior Publication Data

US 2025/0142062 A1     May 1, 2025

Related U.S. Application Data

(60) Provisional application No. 63/546,170, filed on Oct. 27, 2023.

(51) Int. Cl.
H04N 19/117 (2014.01)
H04N 19/176 (2014.01)
H04N 19/80 (2014.01)

(52) U.S. Cl.
CPC ......... H04N 19/117 (2014.11); H04N 19/176 (2014.11); H04N 19/80 (2014.11)

(58) Field of Classification Search
CPC .... H04N 19/105; H04N 19/11; H04N 19/117; H04N 19/159; H04N 19/176; H04N 19/593; H04N 19/80; H04N 19/82
See application file for complete search history.

(56) References Cited

U.S. PATENT DOCUMENTS

2015/0382009 A1    12/2015   Chen et al.
2017/0347093 A1*   11/2017   Yu ........................ H04N 19/593
(Continued)

FOREIGN PATENT DOCUMENTS

CN          117041571      *   7/2023

OTHER PUBLICATIONS

International Search Report and Written Opinion received for PCT Patent Application No. PCT/US2024/053068, mailed on Dec. 17, 2024, 18 pages.

*Primary Examiner* — Md N Haque

(74) *Attorney, Agent, or Firm* — ARENTFOX SCHIFF LLP

(57)          ABSTRACT

One or more template predictions are generated for a template of a current block based on one or more prediction modes. The template includes neighboring samples of the current block. Each of the one or more template predictions is generated based on a respective one of the one or more prediction modes. One or more filters are derived for the current block. Each of the one or more filters is derived based on (i) filter index information or (ii) a respective one of the one or more template predictions and a template reconstruction of the template. One or more predictions of the current block are determined. Each of the one or more predictions is determined based on a respective one of the one or more prediction modes. A final prediction of the current block is determined by applying the one or more filters to the one or more predictions.

20 Claims, 10 Drawing Sheets

(56) References Cited

U.S. PATENT DOCUMENTS

| | | | | |
|---|---|---|---|---|
| 2018/0288425 A1* | 10/2018 | Panusopone | .......... | H04N 19/103 |
| 2022/0232233 A1 | 7/2022 | Zhao et al. | | |
| 2022/0345692 A1* | 10/2022 | Li | ......................... | H04N 19/593 |
| 2022/0417501 A1* | 12/2022 | Yang | ..................... | H04N 19/593 |

* cited by examiner

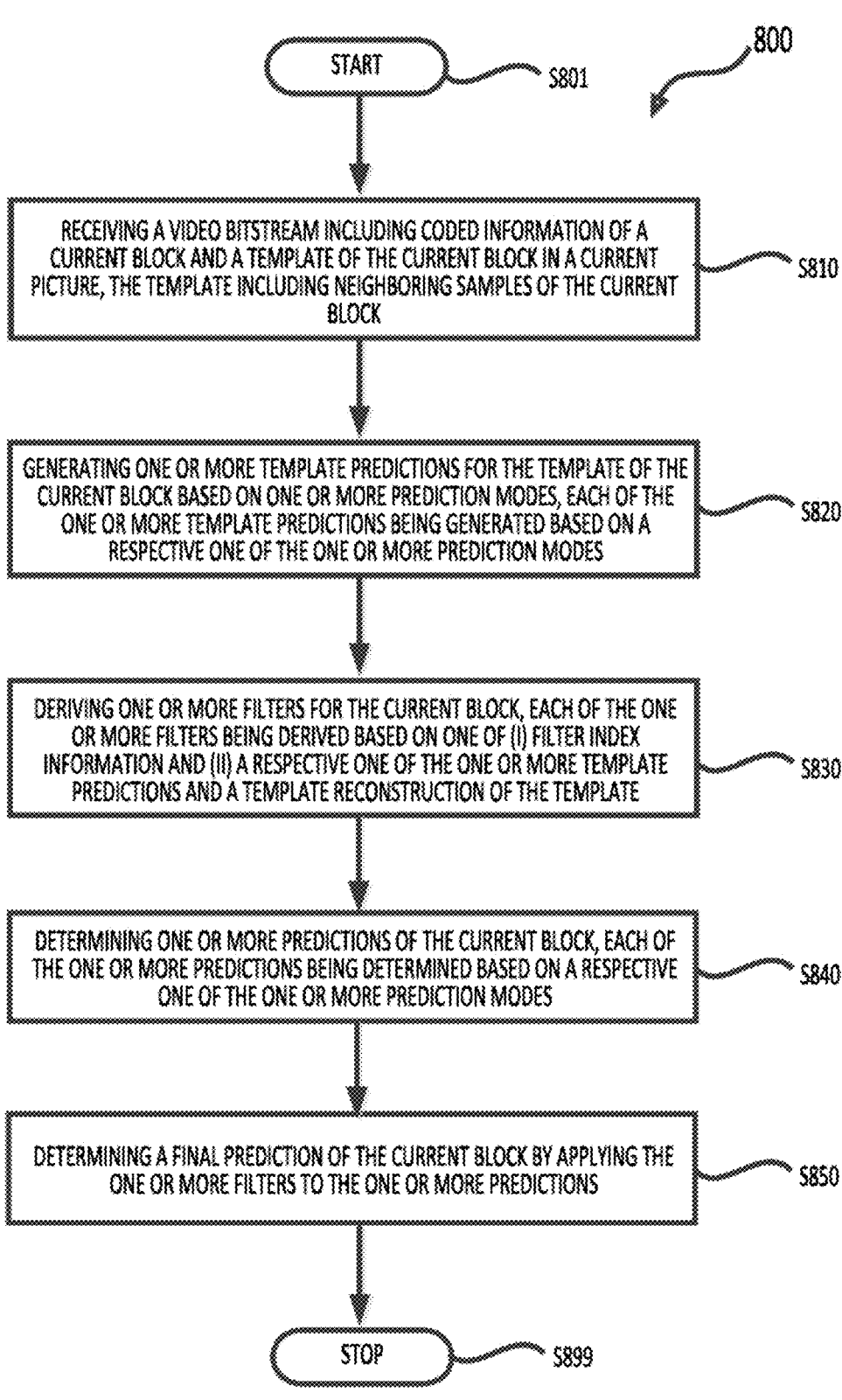

START ~ S801

800

RECEIVING A VIDEO BITSTREAM INCLUDING CODED INFORMATION OF A CURRENT BLOCK AND A TEMPLATE OF THE CURRENT BLOCK IN A CURRENT PICTURE, THE TEMPLATE INCLUDING NEIGHBORING SAMPLES OF THE CURRENT BLOCK ~ S810

GENERATING ONE OR MORE TEMPLATE PREDICTIONS FOR THE TEMPLATE OF THE CURRENT BLOCK BASED ON ONE OR MORE PREDICTION MODES, EACH OF THE ONE OR MORE TEMPLATE PREDICTIONS BEING GENERATED BASED ON A RESPECTIVE ONE OF THE ONE OR MORE PREDICTION MODES ~ S820

DERIVING ONE OR MORE FILTERS FOR THE CURRENT BLOCK, EACH OF THE ONE OR MORE FILTERS BEING DERIVED BASED ON ONE OF (I) FILTER INDEX INFORMATION AND (II) A RESPECTIVE ONE OF THE ONE OR MORE TEMPLATE PREDICTIONS AND A TEMPLATE RECONSTRUCTION OF THE TEMPLATE ~ S830

DETERMINING ONE OR MORE PREDICTIONS OF THE CURRENT BLOCK, EACH OF THE ONE OR MORE PREDICTIONS BEING DETERMINED BASED ON A RESPECTIVE ONE OF THE ONE OR MORE PREDICTION MODES ~ S840

DETERMINING A FINAL PREDICTION OF THE CURRENT BLOCK BY APPLYING THE ONE OR MORE FILTERS TO THE ONE OR MORE PREDICTIONS ~ S850

STOP ~ S899

FIG. 8

REGRESSION MODEL-BASED INTRA PREDICTION

INCORPORATION BY REFERENCE

The present application claims the benefit of priority to U.S. Provisional Application No. 63/546,170, "Regression Model Based Intra Prediction" filed on Oct. 27, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods, and apparatuses for video encoding/decoding. In some examples, an apparatus for video encoding/decoding includes processing circuitry.

According to an aspect of the disclosure, a method of video decoding is provided. In the method, a video bitstream including coded information of a current block and a template of the current block in a current picture is received. The template includes neighboring samples of the current block. One or more template predictions are generated for the template of the current block based on one or more prediction modes. Each of the one or more template predictions is generated based on a respective one of the one or more prediction modes. One or more filters are derived for the current block. Each of the one or more filters is derived based on one of (i) filter index information and (ii) a respective one of the one or more template predictions and a template reconstruction of the template. One or more predictions of the current block are determined. Each of the one or more predictions is determined based on a respective one of the one or more prediction modes. A final prediction of the current block is determined by applying the one or more filters to the one or more predictions.

According to an aspect of the disclosure, a method of video encoding is provided. In the method, one or more template predictions are generated for a template of a current block in a current picture based on one or more prediction modes. The template includes neighboring samples of the current block. Each of the one or more template predictions is generated based on a respective one of the one or more prediction modes. One or more filters are derived for the current block. Each of the one or more filters is derived based on one of (i) filter index information and (ii) a respective one of the one or more template predictions and a template reconstruction of the template. One or more predictions of the current block are determined. Each of the one or more predictions is determined based on a respective one of the one or more prediction modes. A final prediction of the current block is determined by applying the one or more filters to the one or more predictions.

According to yet another aspect of the disclosure, a method of processing visual media data is provided. In the method, a bitstream of the visual media data is processed according to a format rule. In an example, the bitstream includes coded information of a current block and a template of the current block in a current picture, where the template includes neighboring samples of the current block. The format rule specifies that one or more template predictions are generated for the template of the current block based on one or more prediction modes, each of the one or more template predictions being generated based on a respective one of the one or more prediction modes. The format rule specifies that one or more filters are derived for the current block, where each of the one or more filters is derived based on one of (i) filter index information and (ii) a respective one of the one or more template predictions and a template reconstruction of the template. The format rule specifies that one or more predictions of the current block are determined, where each of the one or more predictions is determined based on a respective one of the one or more prediction modes. The format rule specifies that a final prediction of the current block is determined by applying the one or more filters to the one or more predictions.

Aspects of the disclosure also provide an apparatus for video decoding. The apparatus for video decoding includes processing circuitry configured to implement any of the described methods for video decoding.

Aspects of the disclosure also provide an apparatus for video encoding. The apparatus for video encoding includes processing circuitry configured to implement any of the described methods for video encoding.

Aspects of the disclosure also provide a non-transitory computer-readable medium storing instructions which, when executed by a computer, cause the computer to perform any of the described methods for video decoding/encoding.

Technical solutions of the disclosure include methods and apparatuses for improving coding accuracy based on a regression model-based intra prediction. In an example, a video bitstream including coded information of a current block and a template of the current block in a current picture is received. The template includes neighboring samples of the current block. One or more template predictions are generated for the template of the current block based on one or more prediction modes. Each of the one or more template predictions is generated based on a respective one of the one or more prediction modes. One or more filters are derived for the current block. Each of the one or more filters is derived based on one of (i) filter index information and (ii) a respective one of the one or more template predictions and a template reconstruction of the template. One or more predictions of the current block are determined. Each of the one or more predictions is determined based on a respective one of the one or more prediction modes. A final prediction of the current block is determined by applying the one or more filters to the one or more predictions. According to the regression model-based intra prediction, the accuracy of the prediction is improved. More natural and smooth prediction data is obtained.

In an example, a regression model-based intra prediction is provided. In an aspect, a model (e.g., a filter) may be derived by using a template prediction and a template reconstruction of a template of a current block (or current coding block). The model (e.g., a filter) is the applied on a prediction block of the current coding block. The model may be derived by using a linear regression, a non-linear regression, a neural network, and/or a machine learning between the template reconstruction and template prediction. To generate the template prediction, an intra prediction mode, such as a non-angular mode, an angular mode, a matrix-based mode, a template-based mode, and/or a decoder-side derived mode may be used by using the reference of the template. The derived model is then applied on the current prediction block, which may be constructed by the intra prediction mode, and a final prediction block of the current block is obtained.

BRIEF DESCRIPTION OF THE DRAWINGS

Further features, the nature, and various advantages of the disclosed subject matter will be more apparent from the following detailed description and the accompanying drawings in which:

FIG. 8 shows a flow chart outlining a decoding process according to some aspects of the disclosure.

DETAILED DESCRIPTION

Figure 1:
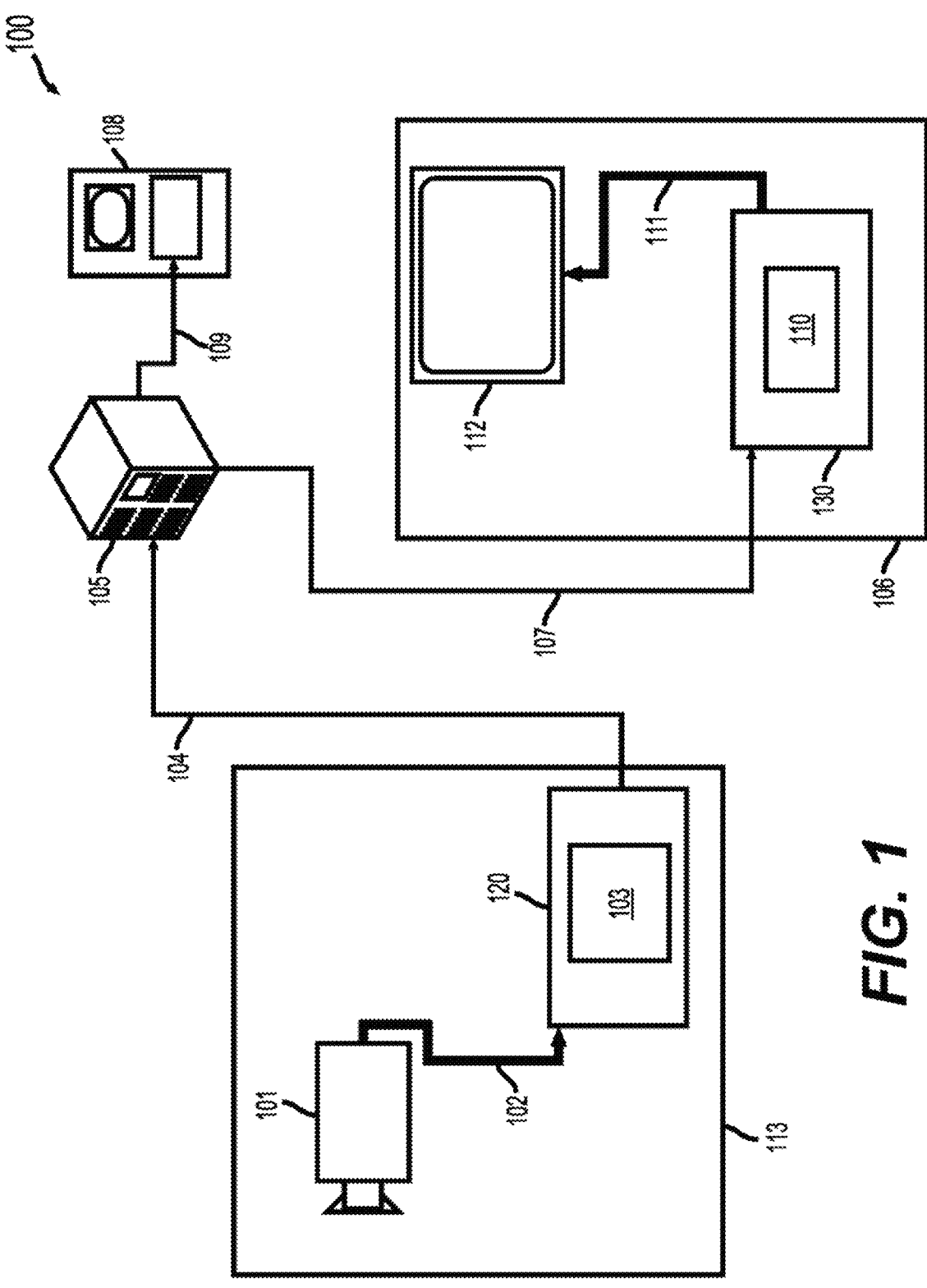
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
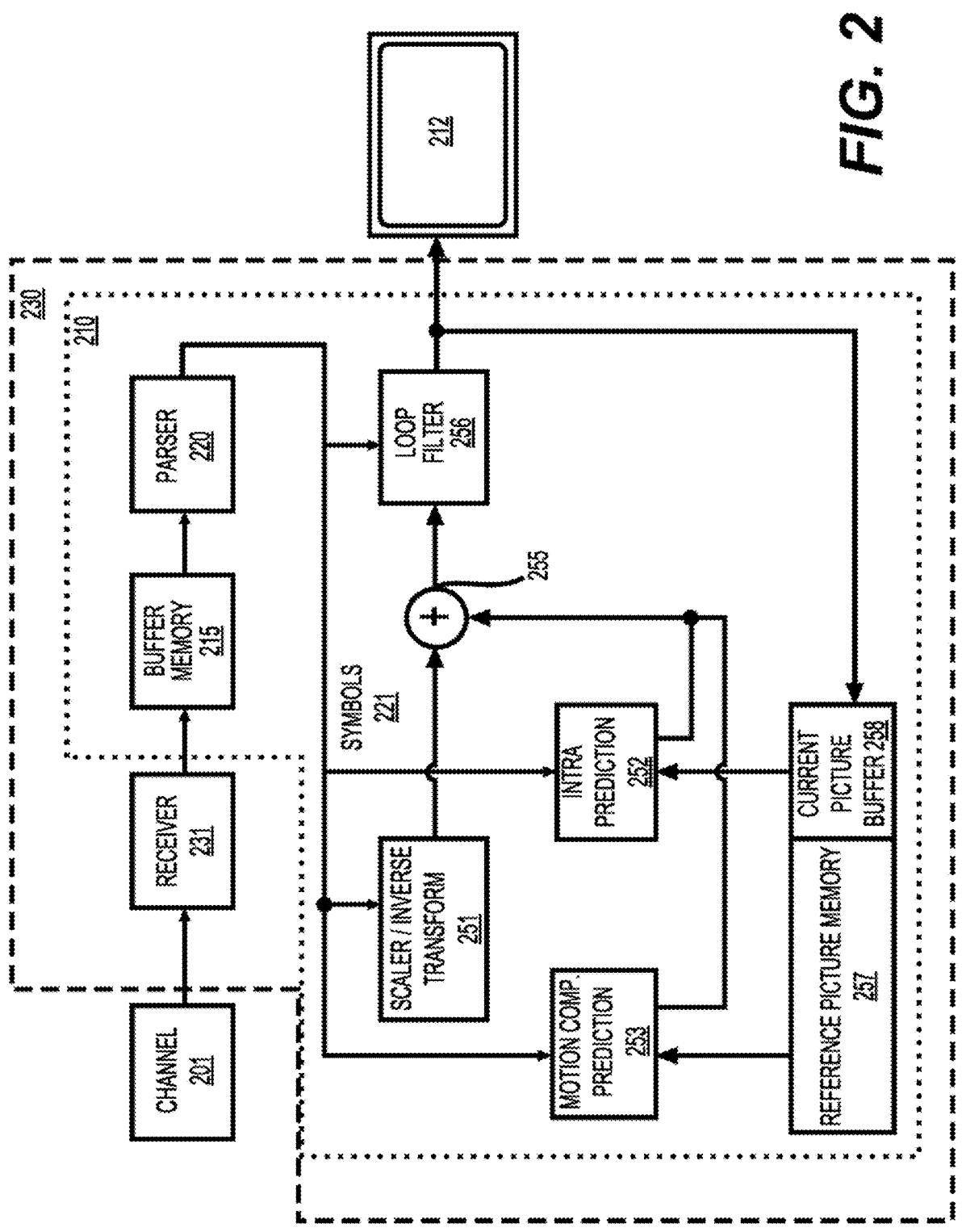
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
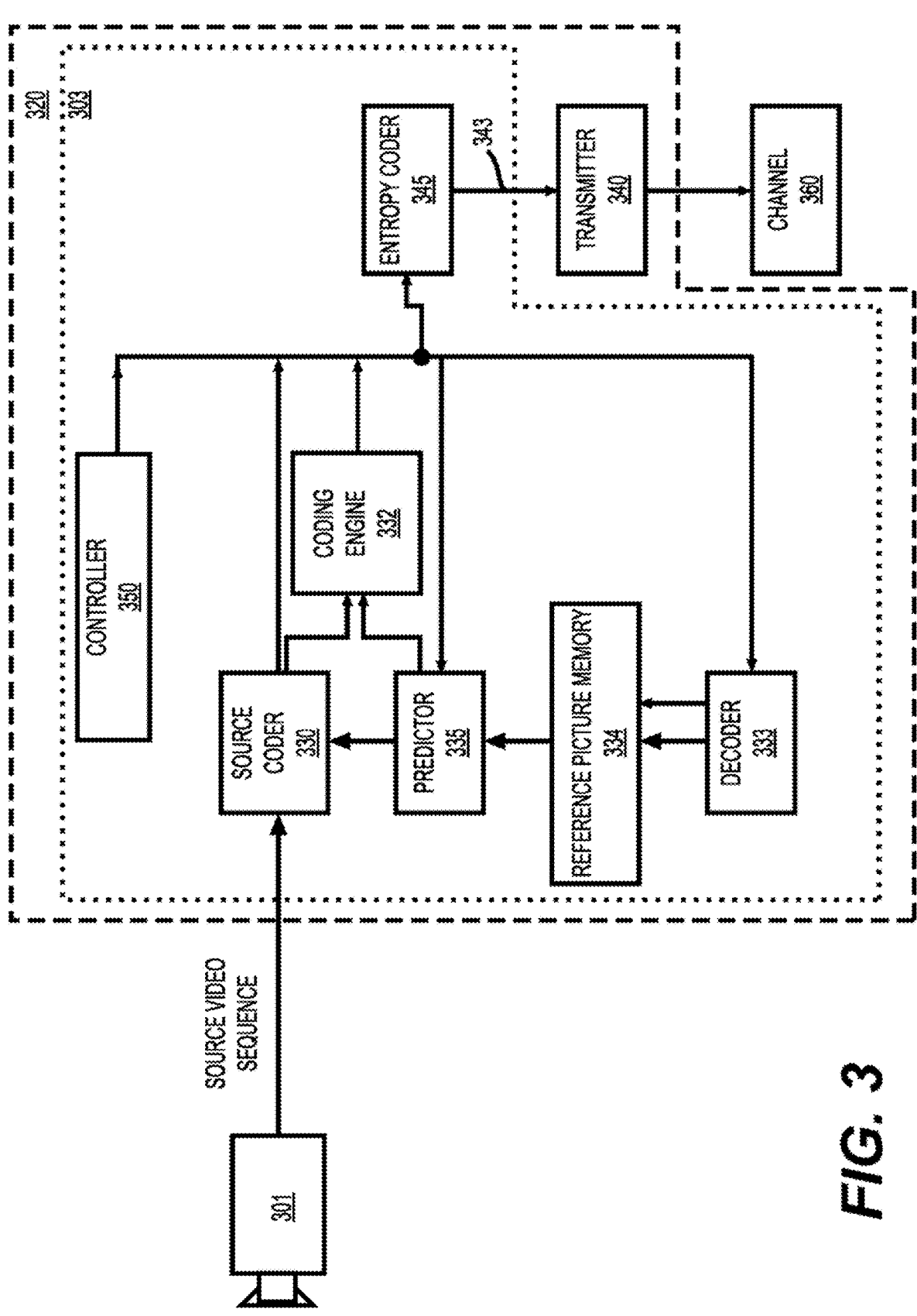
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16

CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure includes methods and systems directed to a regression model-based intra prediction.

Video coding has been widely used in many applications. Various video coding, such as H264, H265, H266 (VVC), AV1, and AVS, have been widely adopted. A video codec generally includes several modules, such as intra/inter prediction, transform coding, quantization, entropy coding and in loop filtering, etc. There have been some intra prediction technologies proposed, which can be both from the conventional signaling processing methods, as well as more recently, the neural network-based methods. This disclose includes a set of methods for video compression, more specifically related to intra prediction filtering.

In order to reduce a signaling overhead, several decoder-side intra prediction mode derivation approaches have been proposed, such as a template cost-based intra prediction mode derivation and a decoder-side gradient based intra prediction mode derivation. The template cost-based intra prediction mode derivation may utilize a cost (or cost value) between a template prediction and a template reconstruction to select an intra prediction mode. The gradient-based intra prediction derivation may make an intra prediction mode histogram based on a template gradient to select intra prediction modes. In addition, to refine prediction samples, a position dependent prediction filtering technology has been proposed. The position dependent prediction filtering may be applied to a template prediction and a current prediction (or a prediction of a current block) to refine prediction samples. According to a block size and a sample position, the position dependent prediction filtering may not be applied to samples which are far from reference samples of the current block.

A current coding block and its neighboring samples may share similar texture characteristics. Thus, neighboring reconstructed samples, called a template, may be employed to predict the current coding block. A method of template-based intra prediction filtering may be applied on the current coding block. When the template and the current coding block are correlated, a relationship between the prediction of the template and the reconstruction of the template may give an indication for a current prediction block of the current block.

Figures 4A, 4B:
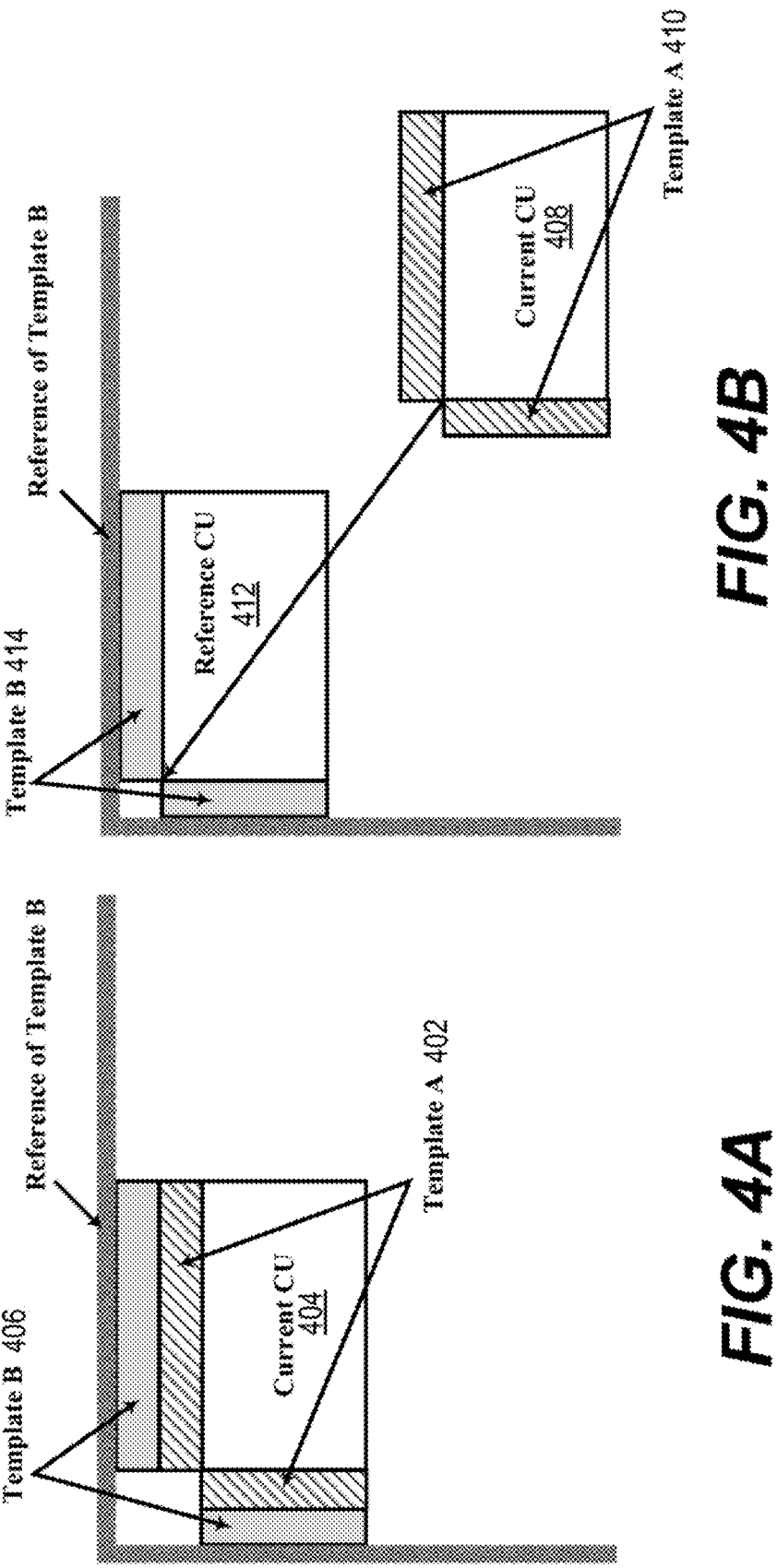
FIGS. 4A and 4B show examples of a local template and a non-local template.

In an aspect of the disclosure, a template reconstruction may refer to reconstruction samples located in an area of the template. If the template adjacent to the current block, the template is called a local template. If the template is not adjacent to the current block, the template is called a non-local template. For example, as shown in FIG. 4A, a template A (402) of a current block (404) is called a local-template, and a template B (406) of the current block (404) is called a non-local-template. In the example of FIG. 4A, the local template A (402) is adjacent to the current block (404), and the non-local template (406) is adjacent to the local template (402). In another example, as shown in FIG. 4B, a current block (408) has a local template (410) and a non-local template (414). The local template (410) is adjacent to the current block (408), the non-local template (414) is adjacent to a reference block (412) of the current block (408), and the local template (410) is not adjacent to the non-local template (414).

Figure 5:
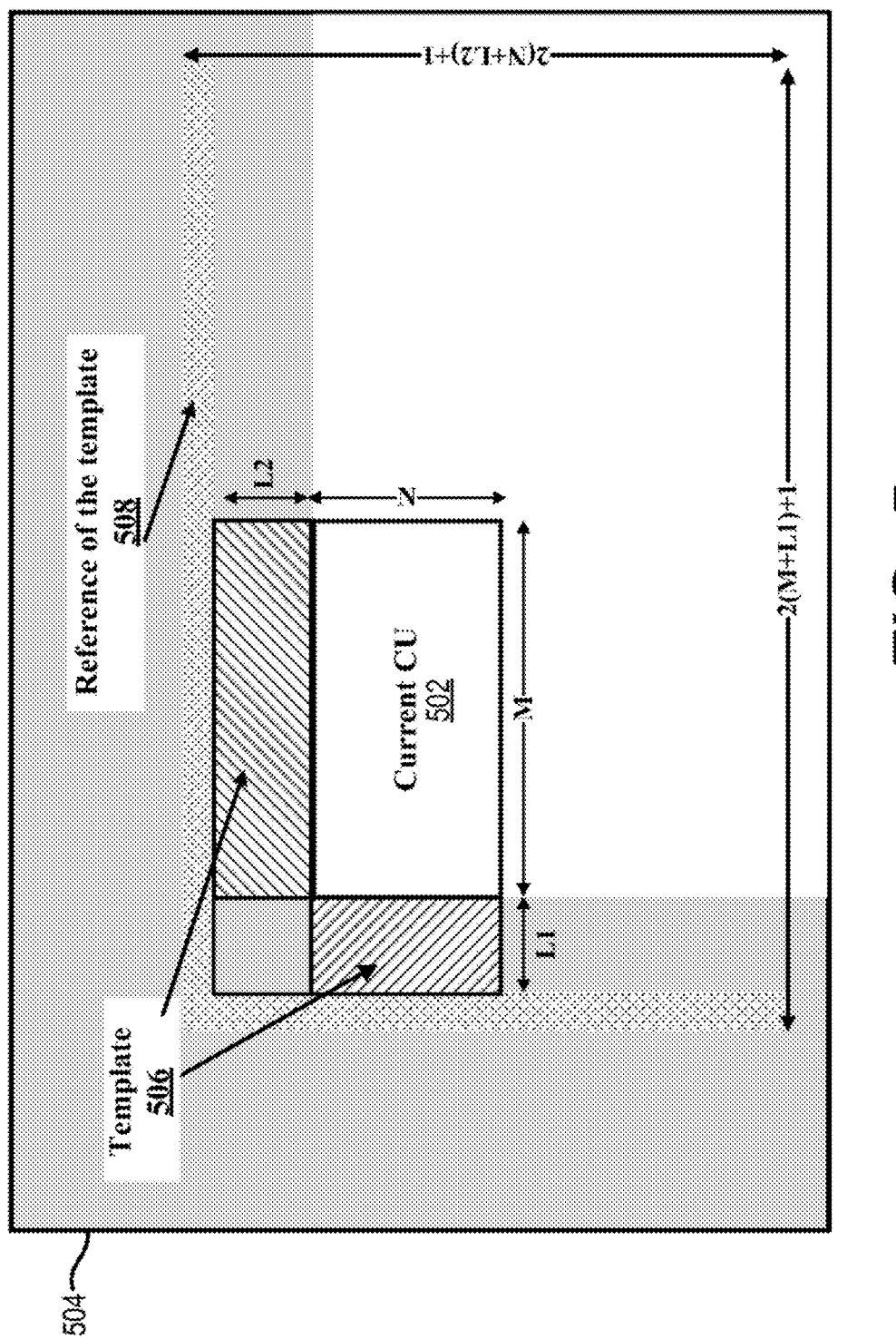
FIG. 5 is a schematic illustration of an example of a filter derivation based on a template according to some aspects of the disclosure.

In an aspect of the disclosure, a template prediction may refer to a prediction of the samples in the template area using neighboring reconstruction samples of the template area. The neighboring reconstruction samples of the template area, which are denoted as "reference of the template" in FIG. 5, may be used as reference samples for predicting the template. As shown in FIG. 5, a current block (502) is included in a current picture (504). The current block (502) has a template (506). The template (506) includes neighboring samples of the current block (502), such as neighboring samples at a top side and a left side of the current block (502). Samples of the template (506) may be predicted based on a reference of the template (508), which includes neighboring reconstruction samples of the template (506).

In an aspect of the disclosure, a cost value is defined as a sum of absolute transformed differences (SATD). However, SATD may also be replaced by other cost metrics, such as a sum of absolute differences (SAD) and a sum of squared errors (SSE).

In an aspect of the disclosure, a decoder-side intra prediction mode derivation may include a template-cost based intra prediction mode derivation (TIMD) and a gradient-based intra prediction mode derivation (DIMD).

In the disclosure, a regression model-based intra prediction is provided. In an aspect, a model (e.g., a filter) may be derived by using a template prediction and a template reconstruction (or a reconstructed template) of a template of a current block (or current coding block). The model (e.g., a filter) is applied on a prediction block (or current prediction block) of the current coding block. The model may be derived by using a linear regression, a non-linear regression, a neural network, and/or a machine learning between the template reconstruction and template prediction. To generate the template prediction, an intra prediction mode, such as a non-angular mode, an angular mode, a matrix-based mode, a template-based mode, and/or a decoder-side derived mode may be used by using a reference of the template, such as the reference of template (508) in FIG. 5. The derived model is then applied on the current prediction block, which may be constructed by the intra prediction mode, and a final prediction block of the current block is obtained based on the processed (or filtered) current prediction block.

Figure 6:
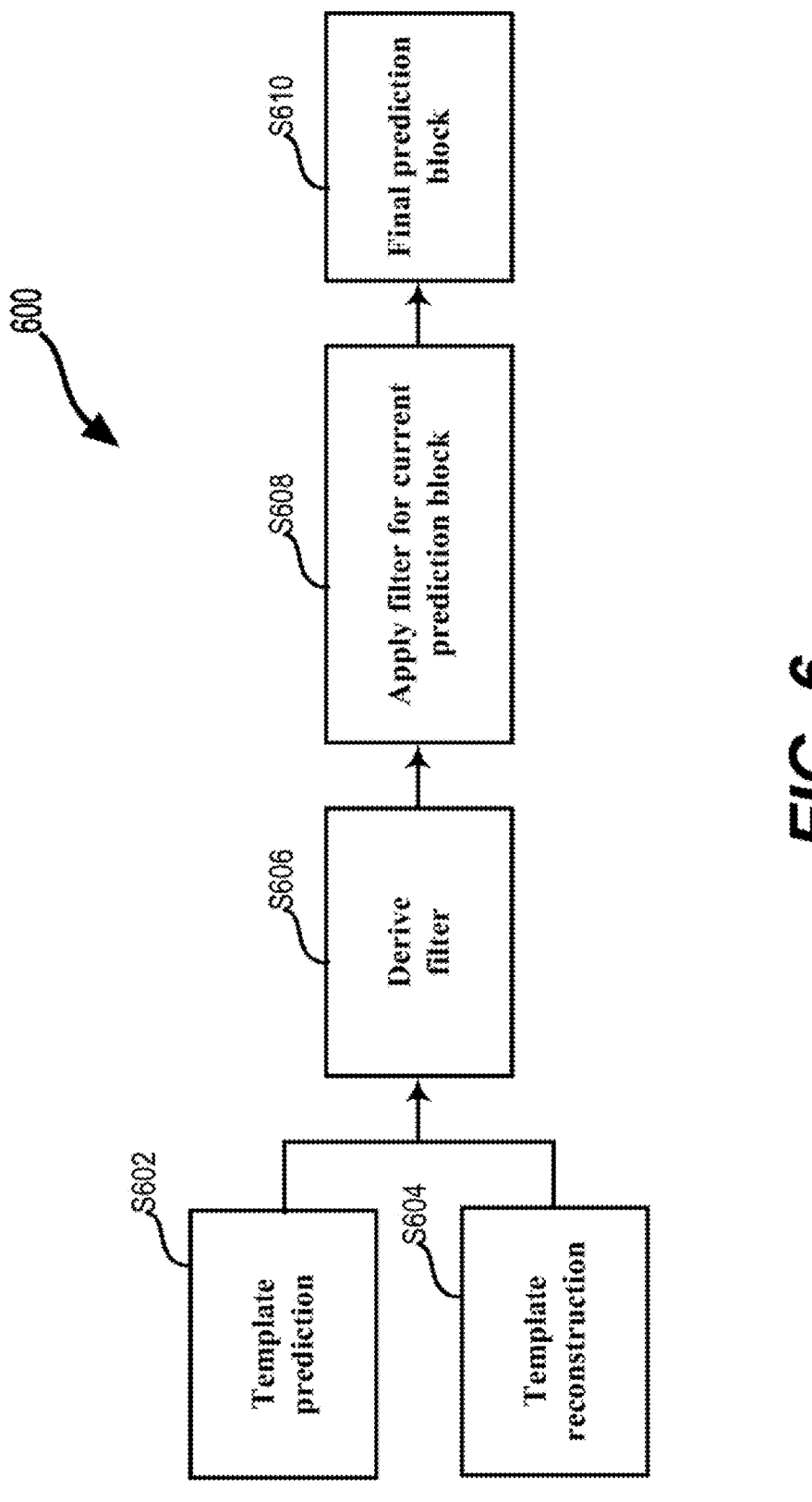
FIG. 6 is a schematic illustration of a first example of a regression model-based intra prediction according to some aspects of the disclosure.
Figure 7:
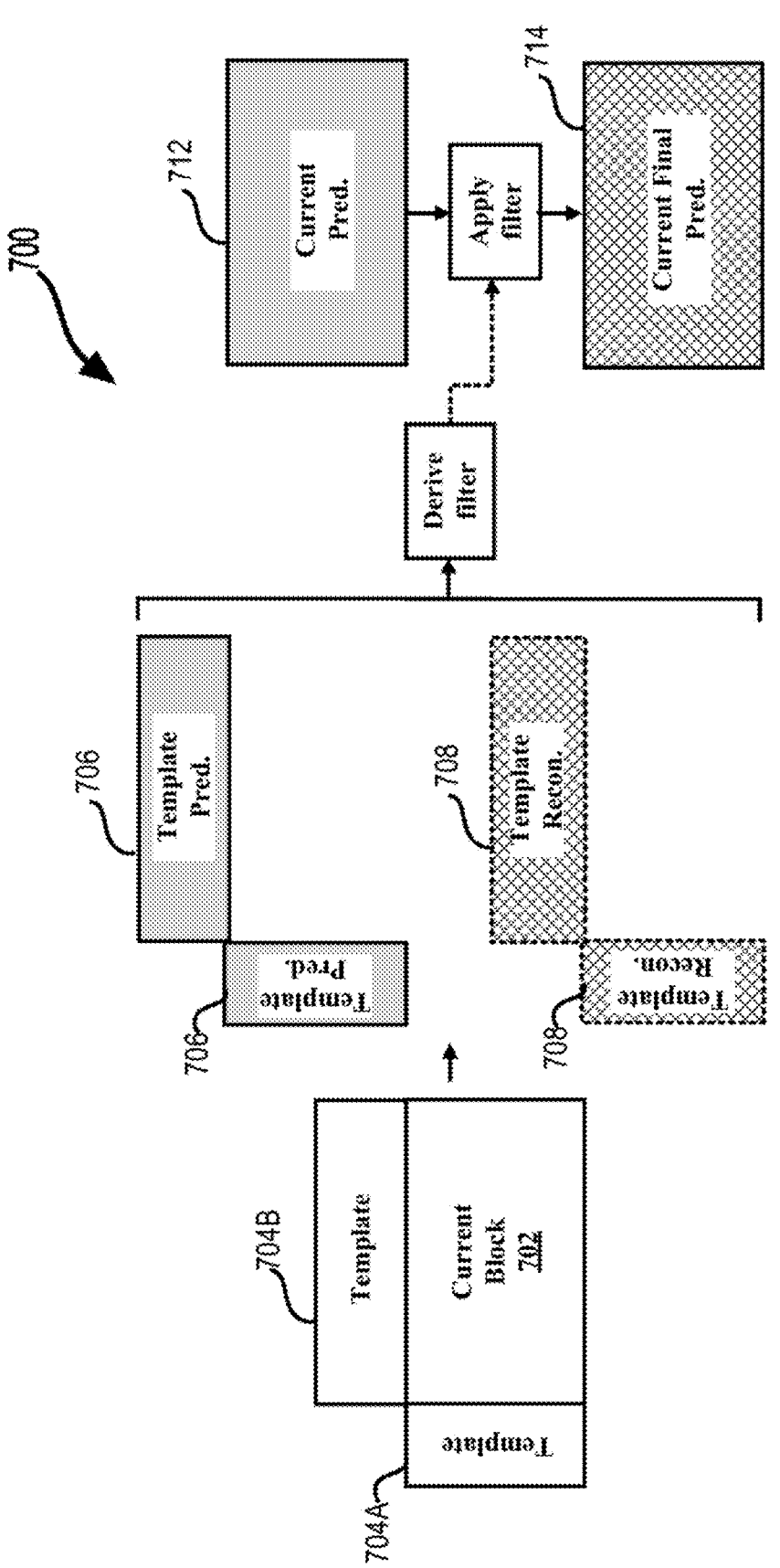
FIG. 7 is a schematic illustration of a second example of the regression model-based intra prediction according to some aspects of the disclosure.

FIGS. 6 and 7 show an example of the disclosed regression model. As shown in FIG. 6, at (S602), a template prediction for a template of a current block is obtained by a prediction mode, such as an intra prediction mode. At (S604), a template reconstruction of the template is obtained. FIG. 7 shows examples of a current block (702), a template of the current block (702), a template prediction (706), and a template reconstruction (708). As shown in FIG. 7, the template may include a left template (704A) and/or a top template (704B). At (S606), a filter is derived. The filter is derived based on the template prediction and the template reconstruction. The filter may be derived based on a linear regression, a non-linear regression, a neural network, and/or a machine learning between the template reconstruction and template prediction. For example, the filter may be derived based on a linear regression between the template prediction and the template reconstruction. At (S608), the filter is applied to a current prediction block of the current block. FIG. 7 shows an example of a current prediction block (712) of the current block (702). The current prediction block may be determined based on an intra prediction mode, such as the intra prediction mode to obtain the template prediction. At (S610), a final prediction block of the current block is obtained by filtering the current prediction block with the derived filter. FIG. 7 shows an example of the final prediction block (714) of the current block (702) that is obtained based on the filtered current prediction block (712).

In an aspect, a model, such as a filter ($f_i$), is derived between a template prediction $$\left(P_i^{temp}\right)$$

which is constructed by a prediction mode, such as an intra prediction mode i, and a template reconstruction (or reconstructed templates) of a template of a current block. The template reconstruction may include a prediction and a residue. In an example, the prediction of the template is not the same as the template prediction ( $$\left(P_i^{temp}\right)$$

based on the intra prediction mode i. In an example, the prediction of the template is the same as the template prediction $$\left(P_i^{temp}\right).$$

The derived filter ($f_i$) is applied to a current prediction block $$\left(P_i^{curr}\right)$$

of the current block. The current prediction block may be predicted by a prediction mode, such as the intra prediction mode i.

In an example, a template of a current block is predicted by a prediction mode among a plurality of prediction mode candidates (or candidate prediction modes). A cost function (e.g., SAD, SATD, etc.) is calculated between each template prediction and the template reconstruction to generate a plurality of costs (or cost values). The costs are sorted. A prediction mode associated with a lowest cost in the prediction mode candidates is selected as the prediction mode. For example, the selected prediction mode is an intra prediction mode i. A filter is then derived between a template prediction constructed by the intra prediction mode i and a template reconstruction. The derived filter is further applied to a current prediction block of the current block. The current prediction (or current prediction block) may be constructed by a prediction mode, such as the intra prediction mode i.

In an example, the prediction mode i is derived using a decoder-side gradient-based intra prediction mode derivation from a template. For example, the prediction mode i is derived based on a gradient-based intra prediction mode derivation (DIMD). The DIMD is based on analyzing gradients in reconstructed neighboring samples (of a template) of a current block. In DIMD, a histogram of gradients (HoG) is computed by applying horizontal and vertical Sobel filters to pixels in the template around the current block. The HoG information is used to derive one or more intra modes from the reconstructed neighbor samples. For example, an intra prediction mode i corresponding to a tallest spike of HoG is selected. The template prediction is generated using the derived prediction mode i and a filter is derived between the template prediction and the template reconstruction. The derived filter is applied to the current prediction block which is predicted by the decoder-side gradient based intra prediction mode. For example, the current prediction block of the current block is generated based on the prediction mode i that is derived based on the decoder-side gradient based intra prediction mode.

In an aspect, a plurality of template predictions of a template of a current block is generated based on a plurality of prediction modes. The plurality of template predictions is fused as a final template prediction (or fused template prediction). A filter is derived between the fused template prediction (or the final template prediction) and a template reconstruction of the template. A plurality of current predictions (or current prediction blocks) is generated by the plurality of prediction modes. The plurality of current predictions is fused to obtain a fused current prediction (or fused current prediction block). The derived filter is applied to the fused current prediction to generate a filtered prediction. A final prediction of the current block is defined as the filtered prediction.

In an example, a fusion method used for fusing the template predictions is also used for fusing the current prediction blocks to obtain the fused current prediction.

In an example, when two template predictions which are predicted by prediction modes $i_1$ and $i_2$ are fused as a final template prediction, a filter ($f_{i_1,i_2}$) is derived from the fused template prediction $$\left(P_{i_1,i_2}^{temp}\right)$$

and a template reconstruction of the template. The derived filter ($f_{i_1,i_2}$) is applied to a fused current prediction $$\left(P_{i_1,i_2}^{curr}\right).$$

The fused current prediction is generated based on two current predictions $$P_{i_1}^{curr}$$

and $$P_{i_2}^{curr}.$$

The two current predictions $$P_{i_1}^{curr}$$

and $$P_{i_2}^{curr}$$

are predicted by the prediction modes $i_1$ and $i_2$ respectively.

In an example, a template of a current block is predicted by each of a plurality of prediction mode candidates (or candidate prediction modes) to generate a plurality of template predictions. A cost function (e.g., SAD, SATD, etc.) is calculated between each template prediction and a template reconstruction of the template to generate a respective cost value. The cost values may further be sorted. Two prediction modes corresponding to a lowest cost value and a second lowest cost value are considered as selected prediction mode $i_1$ and $i_2$, respectively. Further, template predictions having the two lowest cost values are fused as a fused template prediction $$P_{i_1,i_2}^{temp}.$$

A filter $f_{i_1,i_2}$ is derived from the fused template prediction $$\left(P_{i_1,i_2}^{temp}\right)$$

and the template reconstruction. To get a final current prediction of the current block, the derived filter is applied to a fused current prediction block which is fused with two current prediction blocks $$P_{i_1}^{curr}$$

and $$P_{i_2}^{curr}.$$

The two current prediction blocks $$P_{i_1}^{curr}$$

and $$P_{i_2}^{curr}$$

may be generated by two respective prediction modes, such as the prediction mode $i_1$ and $i_2$.

In an aspect, when plural template predictions for a template of a current block are fused as a final template prediction, plural filters are derived. For example, each filter is derived based on a respective template prediction and a template reconstruction of the template. The plural template predictions may be obtained based on a plurality of prediction modes. The derived filters are applied to current predictions of the current block. Each of the current predictions may be generated by a respective one of the plurality of prediction modes. Each of the derived filters is applied to a respective current prediction, in which the respective derived filter and the respective current prediction may correspond to a same prediction mode. The filtered current predictions are fused as a final prediction for the current block. In an example, the template predictions and the current prediction blocks are fused based on a same fusing method. In an example, the template predictions and the current prediction blocks are fused based on different fusing methods.

In an example, when two template predictions of a template which are predicted by prediction modes $i_1$ and $i_2$ are fused as a final template prediction of the template, filters are derived from the two template predictions which are predicted by the prediction mode $i_1$ and $i_2$. Each filter is derived from a respective template prediction and a template reconstruction. Each filter ($f_{i_1}$, $f_{i_2}$) is applied to a respective current prediction block $$\left(P_{i_1}^{curr}, P_{i_2}^{curr}\right).$$

The respective current prediction block and the corresponding filter are constructed by a same prediction mode. Filtered predictions $$\left(P_{i_1}^{\prime curr}, P_{i_2}^{\prime curr}\right)$$

are fused as a final prediction of the current block.

In an example, a template is predicted by one of a plurality of prediction mode candidates (or candidate prediction modes) to generate a plurality of template predictions. A cost function (e.g., SAD, SATD, etc.) is calculated between each template prediction and a template reconstruction of the template to generate a plurality of cost values. The cost values are sorted. Prediction modes corresponding to a lowest cost value and a second lowest cost are considered as prediction mode $i_1$ and $i_2$, respectively. Filters ($f_{i_1}$, $f_{i_2}$) are derived from two template predictions $$\left(P_{i_1}^{temp} \text{ and } P_{i_2}^{temp}\right)$$

that are generated based on the prediction mode $i_1$ and $i_2$. Each of the filters ($f_{i_1}$, $f_{i_2}$) may be derived based on a respective template prediction $$\left(P_{i_1}^{temp} \text{ and } P_{i_2}^{temp}\right)$$

and the template reconstruction of the template. Each filter ($f_{i_1}$, $f_{i_2}$) is applied to a respective current prediction block $$\left(P_{i_1}^{curr}, P_{i_2}^{curr}\right).$$

The respective current prediction block and the corresponding filter are constructed by a same prediction mode. Filtered predictions $$\left(P'^{curr}_{i_1}, P'^{curr}_{i_2}\right)$$

are fused as a final prediction of the current block.

In an aspect, a filter is derived between a template reconstruction and a template prediction, and the template prediction is generated before a position dependent filtering. In an example, the position dependent filtering is different from the derived filter and is not applied to the template prediction. Examples of the position dependent filtering include a position dependent prediction combination (PDPC), an edge-aware filtering, a boundary filtering, a directional filtering, a weighted average filtering, an adaptive quantization, a spatial denoising, a directional deblocking, a temporal filtering, and/or the like. The derived filter is applied to a current prediction block of the current block firstly, and then the position dependent filtering is applied on the current prediction block that has been filtered by the derived filter. Thus, the current prediction block may receive two filtering treatments.

In an aspect, a derived filter includes a horizontal filter, a vertical filter, or a two-dimensional filter. In an example, a filter shape (e.g., a distribution of filter tap locations) of the derived filter is dependent on a block size, a block shape, and other coded information of the current block that is known to both an encoder and a decoder.

In an aspect, a derived filter is applied to selected regions of a current prediction block of a current block. In an example, the selected regions depend on at least one of a block size of the current block, a block shape of the current block, a template size of a template, and other coded information of the current block. In an example, the derived filter is applied to boundaries of a current prediction block of the current block. In an example, a filter derivation of the filter may depend on a selected region of the template. In an example, only a left template (e.g., (704A)) is used. In an example, only a top template (e.g., (704B)) is used. In an example, both the left template and the top template are applied.

In an aspect, a weighted average of a non-filtered prediction sample P and a filtered prediction sample P' is applied to generate a final prediction sample $P_{final}$ of a current block. A weight of the filtered prediction sample P' is $\omega$ ($0 \le \omega \le 1$) and a weight of the non-filtered prediction sample P is $1-\omega$. $\omega$ may be any suitable value between 0 and 1. In an example, a value of $\omega$ is 0.75. In an example, the final prediction sample of the current block is defined in equation (1) as follows:

$$P_{final} = \omega * P' + (1 - \omega) * P \qquad \text{Eq. (1)}$$

In an example, a non-filtered prediction sample $P_i$ is a single prediction which is predicted by a prediction mode i. A filtered prediction $P_i'$ weighted with $\omega$ and the non-filtered prediction P with ($\omega-1$) are combined as a final prediction.

In an example, a plurality of current predictions of a current block is generated. The plurality of current predictions is fused to generate a fused prediction of the current block. The fused prediction is further filtered by a derived filter to generate a filtered prediction of the current block. A weighted average of the fused prediction (or non-filtered prediction) and the filtered prediction is defined as a final prediction of the current block. For example, $P_{i_1,i_2}$ is a fused prediction which is prediction by prediction mode $i_1$ and $i_2$. The fused prediction $P_{i_1,i_2}$ is filtered to generate a filtered prediction $P_{(i_1,i_2)}'$. The filtered prediction $P_{(i_1,i_2)}'$ weighted with $\omega$ and the non-filtered prediction $P_{i_1,i_2}$ weighted with ($\omega-1$) are combined as a final prediction.

In an aspect, a flag or syntax element, such as a filter flag, is signaled to indicate whether a derived filter is applied to a current block or not. In an example, the flag is inferred as false when the current block is at a boundary, such as a frame boundary, a tile boundary, a slice boundary, a coding tree unit (CTU) boundary, etc. In an example, if a neighboring block of the current block is filtered, the filter flag is inferred as true. Accordingly, the derived filter is applied to a prediction of the current block.

In an aspect, a set of derived filters is applied (or defined) in a list, such as a pre-defined list, and an index is signaled to indicate which one of the derived filters is used for filtering a current prediction block of a current block.

In an aspect, a total number of fused predictors is dynamically determined based on various metrics, such as characteristics of prediction modes. The total number of fused predictors indicate how many current prediction blocks are fused to generate a final prediction of the current block. The total number of fused predictions may depend on a number of angular and a number of non-angular modes corresponding to a subset of prediction modes with the least cost values. In an example, when two prediction modes corresponding to two least cost values are both angular, a third predictor (or third current prediction block) is also fused. In an example, when one of the two prediction modes corresponding to the two least cost values is angular and the other one is non-angular, the third predictor is not fused.

In an aspect, a flag or a syntax element, such as an activation flag syntax or the filter flag mentioned above, may indicate whether a residual coding is needed. The activation flag syntax or the filter flag may be signaled or inferred. When the syntax element is enabled, the residual coding may be skipped, and a final prediction of a current block is reconstructed based on a reconstruction signal. Thus, the current block is reconstructed by a current prediction block only, and a residual is not added to the current prediction block.

In an aspect, the regression model-based intra prediction of the disclosure is applied for a luma component of a current block only, a chroma component of the current block only, or both for the luma component and the chroma component of the current block.

FIG. 8 shows a flow chart outlining a process (800) according to an aspect of the disclosure. The process (800) can be used in a video decoder. In various aspects, the process (800) is executed by processing circuitry, such as the processing circuitry that performs functions of the video decoder (110), the processing circuitry that performs functions of the video decoder (210), and the like. In some aspects, the process (800) is implemented in software instructions, thus when the processing circuitry executes the software instructions, the processing circuitry performs the process (800). The process starts at (S801) and proceeds to (S810).

At (S810), a video bitstream including coded information of a current block and a template of the current block in a current picture is received. The template includes neighboring samples of the current block.

At (S820), one or more template predictions are generated for the template of the current block based on one or more prediction modes. Each of the one or more template predictions is generated based on a respective one of the one or more prediction modes.

At (S830), one or more filters are derived for the current block. Each of the one or more filters is derived based on one of (i) filter index information and (ii) a respective one of the one or more template predictions and a template reconstruction of the template.

At (S840), one or more predictions of the current block are determined. Each of the one or more predictions is determined based on a respective one of the one or more prediction modes.

At (S850), a final prediction of the current block is determined by applying the one or more filters to the one or more predictions.

Then, the process proceeds to (S899) and terminates.

The process (800) can be suitably adapted. Step(s) in the process (800) can be modified and/or omitted. Additional step(s) can be added. Any suitable order of implementation can be used.

Figure 9:
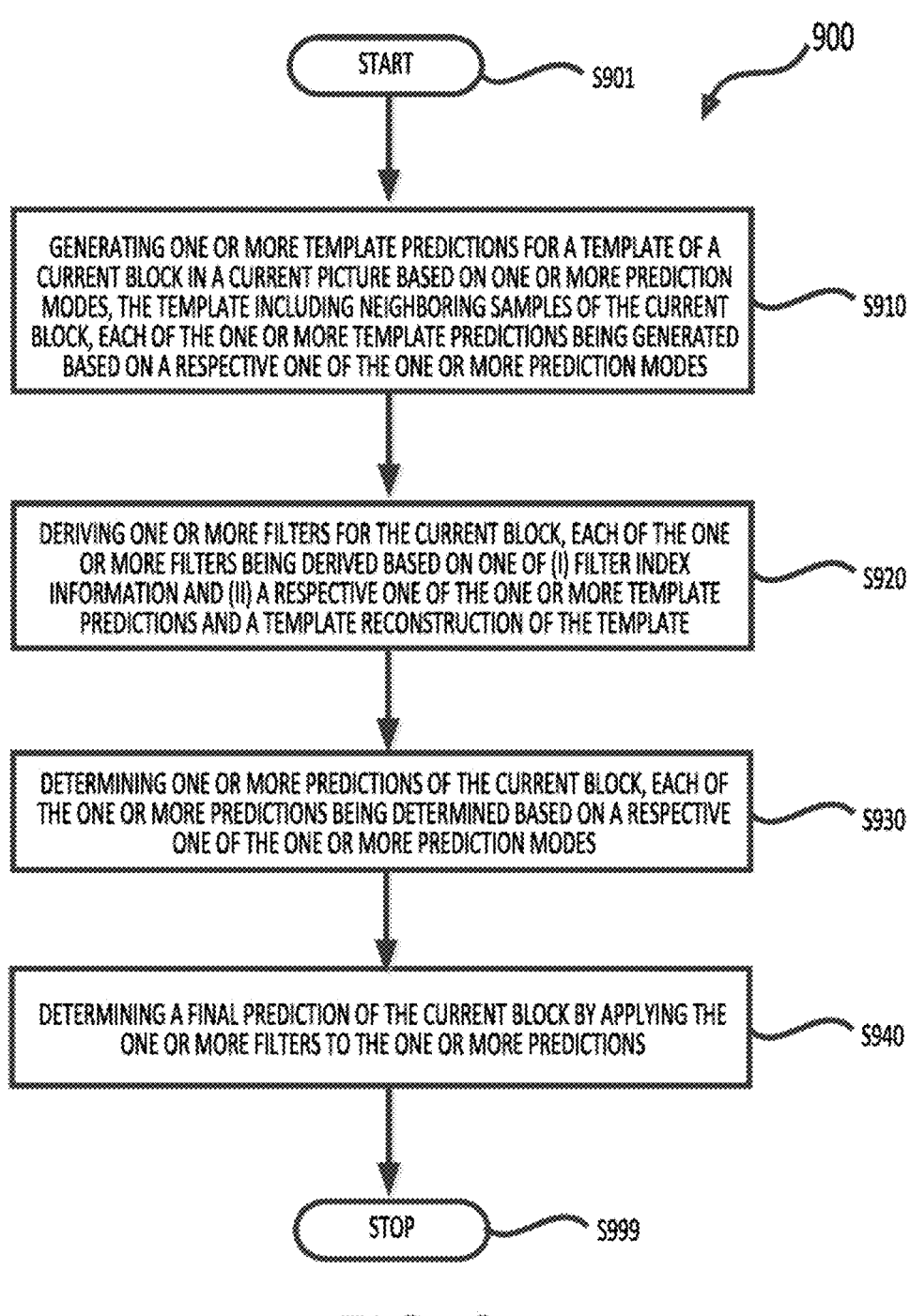
FIG. 9 shows a flow chart outlining an encoding process according to some aspects of the disclosure.

FIG. 9 shows a flow chart outlining a process (900) according to an aspect of the disclosure. The process (900) can be used in a video encoder. In various aspects, the process (900) is executed by processing circuitry, such as the processing circuitry that performs functions of the video encoder (103), the processing circuitry that performs functions of the video encoder (303), and the like. In some aspects, the process (900) is implemented in software instructions, thus when the processing circuitry executes the software instructions, the processing circuitry performs the process (900). The process starts at (S901) and proceeds to (S910).

At (S910), one or more template predictions are generated for a template of a current block in a current picture based on one or more prediction modes. The template includes neighboring samples of the current block. Each of the one or more template predictions is generated based on a respective one of the one or more prediction modes.

At (S920), one or more filters are derived for the current block. Each of the one or more filters is derived based on one of (i) filter index information and (ii) a respective one of the one or more template predictions and a template reconstruction of the template.

At (S930), one or more predictions of the current block are determined. Each of the one or more predictions is determined based on a respective one of the one or more prediction modes.

At (S940), a final prediction of the current block is determined by applying the one or more filters to the one or more predictions.

Then, the process proceeds to (S999) and terminates.

The process (900) can be suitably adapted. Step(s) in the process (900) can be modified and/or omitted. Additional step(s) can be added. Any suitable order of implementation can be used.

In an aspect, a method of processing visual media data includes processing a bitstream of the visual media data according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of a current block and a template of the current block in a current picture, where the template includes neighboring samples of the current block. The format rule specifies that one or more template predictions are generated for the template of the current block based on one or more prediction modes, each of the one or more template predictions being generated based on a respective one of the one or more prediction modes. The format rule specifies that one or more filters are derived for the current block, where each of the one or more filters is derived based on one of (i) filter index information and (ii) a respective one of the one or more template predictions and a template reconstruction of the template. The format rule specifies that one or more predictions of the current block are determined, where each of the one or more predictions is determined based on a respective one of the one or more prediction modes. The format rule specifies that a final prediction of the current block is determined by applying the one or more filters to the one or more predictions.

The techniques described above, can be implemented as computer software using computer-readable instructions and physically stored in one or more computer-readable media. For example, FIG. 10 shows a computer system (1000) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
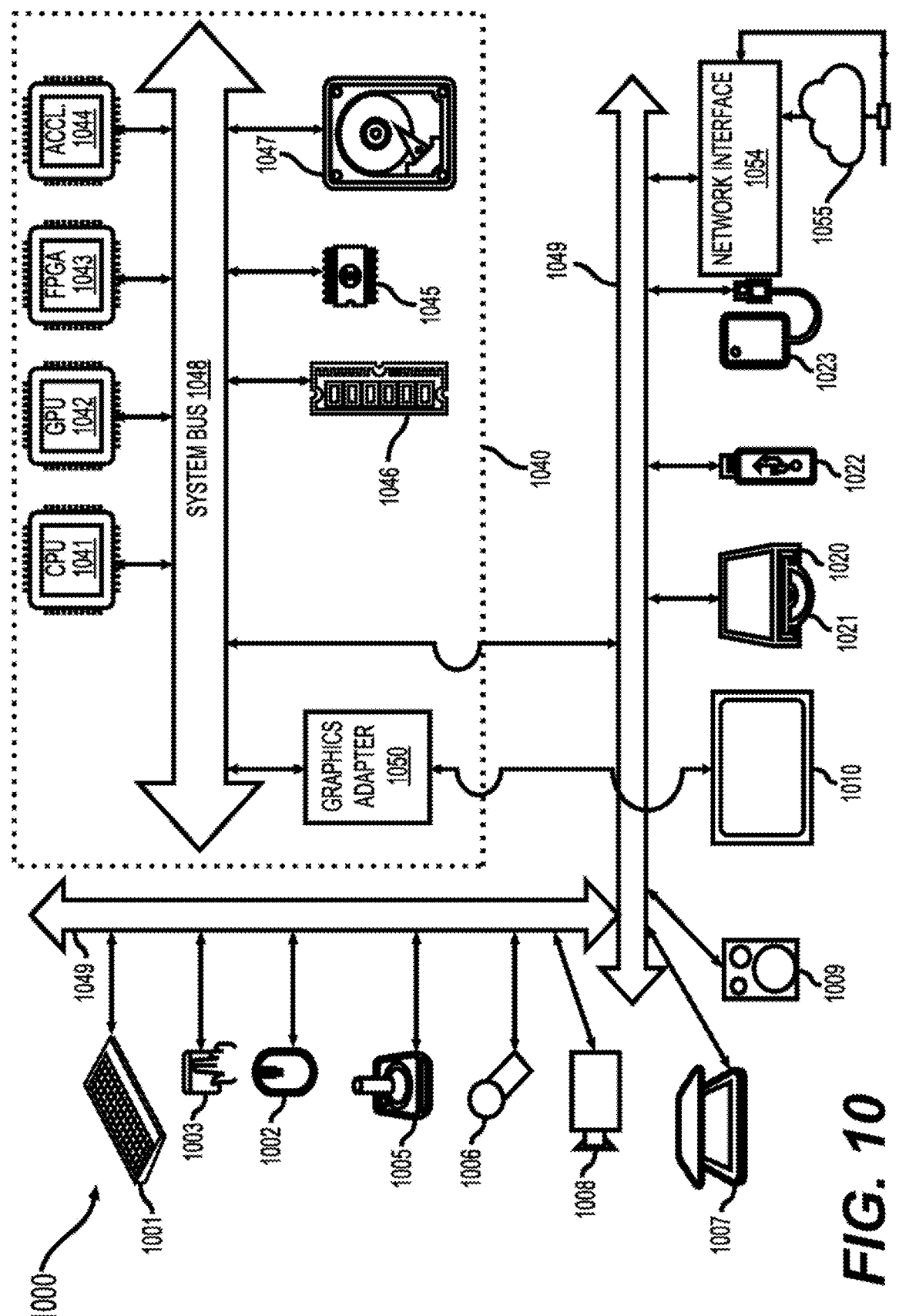
FIG. 10 is a schematic illustration of a computer system in accordance with an aspect.

The components shown in FIG. 10 for computer system (1000) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various aspects of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding, including: receiving a video bitstream including coded information of a current block and a template of the current block in a current picture, the template including neighboring samples of the current block; generating one or more template predictions for the template of the current block based on one or more prediction modes, each of the one or more template predictions being generated based on a respective one of the one or more prediction modes; deriving one or more filters for the current block, each of the one or more filters being derived based on one of (i) filter index information and (ii) a respective one of the one or more template predictions and a template reconstruction of the template; determining one or more predictions of the current block, each of the one or more predictions being determined based on a respective one of the one or more prediction modes; and determining a final prediction of the current block by applying the one or more filters to the one or more predictions.

(2) The method of feature (1), in which: the one or more template predictions includes a template prediction; the one or more prediction modes includes a prediction mode; the generating the one or more template predictions further includes: generating a plurality of candidate template predictions based on a plurality of candidate prediction modes, and determining the template prediction as one of the plurality of candidate template predictions that corresponds to a smallest cost value among cost values between the plurality of candidate template predictions and the template reconstruction of the template; the deriving the one or more filters for the current block includes deriving a filter based on the template prediction and the template reconstruction of the template; the determining the one or more predictions of the current block includes determining a prediction of the current block based on the one of the plurality of candidate prediction modes through which the template prediction is determined; and the determining the final prediction of the current block includes applying the filter to the prediction of the current block to generate the final prediction of the current block.

(3) The method of any of features (1) to (2), in which: the one or more template predictions includes a plurality of template predictions; the one or more prediction modes includes a plurality of prediction modes; the generating the one or more template predictions further includes: generating the plurality of template predictions based on the plurality of prediction modes, and generating a fused template prediction based on the plurality of template predictions; the deriving the one or more filters for the current block includes deriving a filter based on the fused template prediction and the template reconstruction; the determining the one or more predictions of the current block further includes: generating a plurality of predictions based on the plurality of prediction modes, an generating a fused prediction based on the plurality of predictions; and the determining the final prediction of the current block includes applying the filter to the fused prediction of the current block to generate the final prediction of the current block.

(4) The method of any of features (1) to (3), in which: the one or more template predictions includes a plurality of template predictions; the one or more prediction modes includes a plurality of prediction modes; the generating the one or more template predictions further includes: generating the plurality of template predictions based on the plurality of prediction modes, determining a cost value between each of the plurality of template predictions and the template reconstruction, determining two of the plurality of template predictions that correspond to two smallest cost values of cost values between the plurality of template predictions and the template reconstruction, and generating a fused template prediction based on the two of the plurality of template predictions; and the deriving the one or more filters for the current block includes deriving a filter based on the fused template prediction and the template reconstruction; the determining the one or more predictions of the current block includes: generating two predictions of the current block based on two of the plurality of prediction modes that correspond to the two of the plurality of template predictions, and generating a fused prediction based on the two predictions of the current block; and the determining the final prediction of the current block includes applying the filter to the fused prediction of the current block to generate the final prediction of the current block.

(5) The method of any of features (1) to (4), in which: the one or more template predictions includes a plurality of template predictions; the one or more prediction modes includes a plurality of prediction modes; the generating the one or more template predictions includes generating the plurality of template predictions based on the plurality of prediction modes; the deriving the one or more filters for the current block includes deriving a plurality of filters for the current block, each of the plurality of filters being derived based on a respective one of the plurality of template predictions and the template reconstruction of the template; the determining the one or more predictions of the current block includes generating a plurality of predictions based on the plurality of prediction modes; and the determining the final prediction of the current block further includes: applying each of the plurality of filters to a respective one of the plurality of predictions to generate a filtered prediction, the respective filter and the respective one of the plurality of predictions corresponding to a same prediction mode, and determining the final prediction based on a fused prediction of the filtered predictions.

(6) The method of any of features (1) to (5), in which: the one or more template predictions includes a plurality of template predictions; the one or more prediction modes includes a plurality of prediction modes; the generating the one or more template predictions further includes: generating the plurality of template predictions based on the plurality of prediction modes, determining a cost value between each of the plurality of template predictions and the template reconstruction of the template, and determining two template predictions from the plurality of template predictions that correspond to two smallest cost values of cost values between the plurality of template predictions and the template reconstruction; the deriving the one or more filters for the current block includes deriving two filters for the current block, each of the two filters being derived based on a respective one of the two template predictions and the template reconstruction; the determining the one or more predictions of the current block includes generating two predictions based on two of the plurality of prediction modes that correspond to the two filters; and the determining the final prediction of the current block further includes: applying each of the two filters to a respective one of the two predictions to generate a filtered prediction, the respective filter and the respective one of the two predictions corresponding to a same prediction mode, and determining the final prediction based on a fused prediction of the two filtered predictions.

(7) The method of any of features (1) to (6), in which: the final prediction of the current block includes a first filtering based on the one or more filters and a second filtering according to a position dependent filtering that is performed after the first filtering.

(8) The method of any of features (1) to (7), in which each of the one or more filters is one of a horizontal filter, a vertical filter, and a two-dimensional filter that is determined by one of a block size, a block shape, and the coded information of the current block.

(9) The method of any of features (1) to (8), in which: the one or more filters are derived based on a selected region of the template, the selected region of the template including one of a left template and a top template, the left template including the neighboring samples at a left side of the current block, the top template including the neighboring samples at a top side of the current block, and the one or more filters are applied to a selected region of the one or more predictions of the current block, the selected region of the one or more predictions of the current block being defined by one of a block size, a block shape, a size of the template, and the coded information of the current block.

(10) The method of any of features (1) to (9), in which: the one or more filters includes a filter; and the determining the final prediction of the current block further includes: determining a fused prediction based on the one or more predictions of the current block, applying the filter to the fused prediction to generate a filtered prediction, and determining the final prediction as a weighted sum of the fused prediction and the filtered prediction.

(11) The method of any of features (1) to (10), in which the coded information includes a filter flag that indicates whether the one or more filters are applied to the one or more predictions of the current block.

(12) The method of any of features (1) to (11), in which: when the current block is positioned on one of a frame boundary, a tile boundary, a slice boundary, a CTU boundary, a filter flag is inferred as indicating that the one or more filters are not applied to the one or more predictions of the current block, and when a neighboring block of the current block is filtered, the filter flag is inferred as indicating that the one or more filters are applied to the one or more predictions of the current block.

(13) The method of any of features (1) to (12), in which each of the one or more filters is derived based on the filter index information that indicates a filter from a set of pre-defined derivation filters.

(14) The method of any of features (1) to (13), in which: the one or more prediction modes includes a plurality of prediction modes; the one or more predictions of the current block includes a plurality of predictions based on the plurality of the prediction modes; and the determining the final prediction of the current block further includes: selecting two predictions of the plurality of predictions that are generated based on two of the plurality of prediction modes, the two of the plurality of prediction modes corresponding to two smallest cost values of cost values between a plurality of template predictions and the template reconstruction of the template, when both the two of the plurality of prediction modes are angular, determining the final prediction of the current block as a fused prediction of the two predictions and another one of the plurality of predictions of the current block, and when one of the two of the plurality of prediction modes is angular and the other one of the two of the plurality of prediction modes is non-angular, determining the final prediction of the current block as a fused prediction of the two predictions of the current block.

(15) The method of any of features (1) to (11), in which the filter flag further indicates whether residual coding is skipped for the current block.

(16) The method of any of features (1) to (15), in which the determining the final prediction of the current block further includes: determining the final prediction of one of a luma component, a chroma component, and both the luma component and the chroma component of the current block.

(17) A method of video encoding, including: generating one or more template predictions for a template of a current block in a current picture based on one or more prediction modes, the template including neighboring samples of the current block, each of the one or more template predictions being generated based on a respective one of the one or more prediction modes; deriving one or more filters for the current block, each of the one or more filters being derived based on one of (i) filter index information and (ii) a respective one of the one or more template predictions and a template reconstruction of the template; determining one or more predictions of the current block, each of the one or more predictions being determined based on a respective one of the one or more prediction modes; and determining a final prediction of the current block by applying the one or more filters to the one or more predictions.

(18) The method of feature (17), in which: the one or more template predictions includes a template prediction; the one or more prediction modes includes a prediction mode; the generating the one or more template predictions further includes: generating a plurality of candidate template predictions based on a plurality of candidate prediction modes, and determining the template prediction as one of the plurality of candidate template predictions that corresponds to a smallest cost value among cost values between the plurality of candidate template predictions and the template reconstruction of the template; the deriving the one or more filters for the current block includes deriving a filter based on the template prediction and the template reconstruction of the template; the determining the one or more predictions of the current block includes determining a prediction of the current block based on the one of the plurality of candidate prediction modes through which the template prediction is determined; and the determining the final prediction of the current block includes applying the filter to the prediction of the current block to generate the final prediction of the current block.

(19) The method of any of features (17) to (18), in which: the one or more template predictions includes a plurality of template predictions; the one or more prediction modes includes a plurality of prediction modes; the generating the one or more template predictions further includes: generating the plurality of template predictions based on the plurality of prediction modes, and generating a fused template prediction based on the plurality of template predictions; the deriving the one or more filters for the current block includes deriving a filter based on the fused template prediction and the template reconstruction; the determining the one or more predictions of the current block further includes: generating a plurality of predictions based on the plurality of prediction modes, and generating a fused prediction based on the plurality of predictions; and the determining the final prediction of the current block includes applying the filter to the fused prediction of the current block to generate the final prediction of the current block.

(20) A method of processing visual media data, the method including: processing a bitstream of the visual media data according to a format rule, in which: the bitstream includes coded information of a current block and a template of the current block in a current picture, the template including neighboring samples of the current block; and the format rule specifies that: one or more template predictions are generated for the template of the current block based on one or more prediction modes, each of the one or more template predictions being generated based on a respective one of the one or more prediction modes; one or more filters are derived for the current block, each of the one or more filters being derived based on one of (i) filter index information and (ii) a respective one of the one or more template predictions and a template reconstruction of the template; one or more predictions of the current block are determined, each of the one or more predictions being determined based on a respective one of the one or more prediction modes; and a final prediction of the current block is determined by applying the one or more filters to the one or more predictions.

(21) An apparatus for video decoding, including processing circuitry that is configured to perform the method of any of features (1) to (16).

(22) An apparatus for video encoding, including processing circuitry that is configured to perform the method of any of features (17) to (19).

(23) A non-transitory computer-readable storage medium storing instructions which when executed by at least one processor cause the at least one processor to perform the method of any of features (1) to (19).

What is claimed is:

1. A method of video decoding, comprising:

receiving a video bitstream including coded information of a current block and a template of the current block in a current picture, the template including neighboring samples of the current block;

generating one or more template predictions for the template of the current block based on one or more prediction modes, each of the one or more template predictions being generated based on a respective one of the one or more prediction modes;

deriving one or more filters for the current block, each of the one or more filters being derived based on one of (i) filter index information and (ii) a respective one of the one or more template predictions and a template reconstruction of the template;

determining one or more predictions of the current block, each of the one or more predictions being determined based on a respective one of the one or more prediction modes; and determining a final prediction of the current block based on a weighted combination of (i) the one or more predictions and (ii) a filtered prediction, the filtered prediction being determined based on the one or more filters and the one or more predictions.

2. The method of claim 1, wherein:

the one or more template predictions include a template prediction;

the one or more prediction modes include a prediction mode;

the generating the one or more template predictions further comprises:

generating a plurality of candidate template predictions based on a plurality of candidate prediction modes, and determining the template prediction as one of the plurality of candidate template predictions that corresponds to a smallest cost value among cost values between the plurality of candidate template predictions and the template reconstruction of the template;

the deriving the one or more filters for the current block includes deriving a filter based on the template prediction and the template reconstruction of the template;

the determining the one or more predictions of the current block includes determining a prediction of the current block based on the one of the plurality of candidate prediction modes through which the template prediction is determined; and the determining the final prediction of the current block includes applying the filter to the prediction of the current block to generate the final prediction of the current block.

3. The method of claim 1, wherein:

the one or more template predictions include a plurality of template predictions;

the one or more prediction modes include a plurality of prediction modes;

the generating the one or more template predictions further comprises:

generating the plurality of template predictions based on the plurality of prediction modes, and generating a fused template prediction based on the plurality of template predictions;

the deriving the one or more filters for the current block includes deriving a filter based on the fused template prediction and the template reconstruction;

the determining the one or more predictions of the current block further comprises:

generating a plurality of predictions based on the plurality of prediction modes, and generating a fused prediction based on the plurality of predictions; and the determining the final prediction of the current block includes applying the filter to the fused prediction of the current block to generate the final prediction of the current block.

4. The method of claim 1, wherein:

the one or more template predictions include a plurality of template predictions;

the one or more prediction modes include a plurality of prediction modes;

the generating the one or more template predictions further comprises:

generating the plurality of template predictions based on the plurality of prediction modes, determining a cost value between each of the plurality of template predictions and the template reconstruction, determining two of the plurality of template predictions that correspond to two smallest cost values of cost values between the plurality of template predictions and the template reconstruction, and generating a fused template prediction based on the two of the plurality of template predictions;

the deriving the one or more filters for the current block includes deriving a filter based on the fused template prediction and the template reconstruction;

the determining the one or more predictions of the current block comprises:

generating two predictions of the current block based on two of the plurality of prediction modes that correspond to the two of the plurality of template predictions, and generating a fused prediction based on the two predictions of the current block; and the determining the final prediction of the current block includes applying the filter to the fused prediction of the current block to generate the final prediction of the current block.

5. The method of claim 1, wherein:

the one or more template predictions include a plurality of template predictions;

the one or more prediction modes include a plurality of prediction modes;

the generating the one or more template predictions includes generating the plurality of template predictions based on the plurality of prediction modes;

the deriving the one or more filters for the current block includes deriving a plurality of filters for the current block, each of the plurality of filters being derived based on a respective one of the plurality of template predictions and the template reconstruction of the template;

the determining the one or more predictions of the current block includes generating a plurality of predictions based on the plurality of prediction modes; and the determining the final prediction of the current block further comprises:

applying each of the plurality of filters to a respective one of the plurality of predictions to generate a corresponding filtered result, the respective filter and the respective one of the plurality of predictions corresponding to a same prediction mode, and determining the final prediction based on the filtered prediction that is a fused prediction of the filtered results.

6. The method of claim 1, wherein:

the one or more template predictions include a plurality of template predictions;

the one or more prediction modes include a plurality of prediction modes;

the generating the one or more template predictions further comprises:

generating the plurality of template predictions based on the plurality of prediction modes, determining a cost value between each of the plurality of template predictions and the template reconstruction of the template, and determining two template predictions from the plurality of template predictions that correspond to two smallest cost values of cost values between the plurality of template predictions and the template reconstruction;

the deriving the one or more filters for the current block includes deriving two filters for the current block, each of the two filters being derived based on a respective one of the two template predictions and the template reconstruction;

the determining the one or more predictions of the current block includes generating two predictions based on two of the plurality of prediction modes that correspond to the two filters; and the determining the final prediction of the current block further comprises:

applying each of the two filters to a respective one of the two predictions to generate two filtered results, the respective filter and the respective one of the two predictions corresponding to a same prediction mode, and determining the final prediction based on the filtered prediction that is a fused prediction of the two filtered results.

7. The method of claim 1, wherein:

the final prediction of the current block includes a first filtering based on the one or more filters and a second filtering according to a position dependent filtering that is performed after the first filtering.

8. The method of claim 1, wherein each of the one or more filters is one of a horizontal filter, a vertical filter, and a two-dimensional filter that is determined by one of a block size, a block shape, and the coded information of the current block.

9. The method of claim 1, wherein:

the one or more filters are derived based on a selected region of the template, the selected region of the template including one of a left template and a top template, the left template including the neighboring samples at a left side of the current block, the top template including the neighboring samples at a top side of the current block, and the one or more filters are applied to a selected region of the one or more predictions of the current block, the selected region of the one or more predictions of the current block being defined by one of a block size, a block shape, a size of the template, and the coded information of the current block.

10. The method of claim 1, wherein:

the one or more filters include a filter; and the determining the final prediction of the current block further comprises:

determining a fused prediction based on the one or more predictions of the current block, applying the filter to the fused prediction to generate the filtered prediction, and determining the final prediction as a weighted sum of the fused prediction and the filtered prediction.

11. The method of claim 1, wherein the coded information includes a filter flag that indicates whether the one or more filters are applied to the one or more predictions of the current block.

12. The method of claim 1, wherein:

when the current block is positioned on one of a frame boundary, a tile boundary, a slice boundary, a CTU boundary, a filter flag is inferred as indicating that the one or more filters are not applied to the one or more predictions of the current block, and when a neighboring block of the current block is filtered, the filter flag is inferred as indicating that the one or more filters are applied to the one or more predictions of the current block.

13. The method of claim 1, wherein each of the one or more filters is derived based on the filter index information that indicates a filter from a set of pre-defined derivation filters.

14. The method of claim 1, wherein:

the one or more prediction modes include a plurality of prediction modes;

the one or more predictions of the current block include a plurality of predictions based on the plurality of prediction modes; and the determining the final prediction of the current block further comprises:

selecting two predictions of the plurality of predictions that are generated based on two of the plurality of prediction modes, the two of the plurality of prediction modes corresponding to two smallest cost values of cost values between a plurality of template predictions and the template reconstruction of the template, when both the two of the plurality of prediction modes are angular, determining the final prediction of the current block as a fused prediction of the two predictions and another one of the plurality of predictions of the current block, and when one of the two of the plurality of prediction modes is angular and the other one of the two of the plurality of prediction modes is non-angular, determining the final prediction of the current block as a fused prediction of the two predictions of the current block.

15. The method of claim 11, wherein the filter flag further indicates whether residual coding is skipped for the current block.

16. The method of claim 1, wherein the determining the final prediction of the current block further comprises:

determining the final prediction of one of a luma component, a chroma component, and both the luma component and the chroma component of the current block.

17. A method of video encoding, comprising:

generating one or more template predictions for a template of a current block in a current picture based on one or more prediction modes, the template including neighboring samples of the current block, each of the one or more template predictions being generated based on a respective one of the one or more prediction modes;

deriving one or more filters for the current block, each of the one or more filters being derived based on one of (i) filter index information and (ii) a respective one of the one or more template predictions and a template reconstruction of the template;

determining one or more predictions of the current block, each of the one or more predictions being determined based on a respective one of the one or more prediction modes; and determining a final prediction of the current block based on a weighted combination of (i) the one or more predictions and (ii) a filtered prediction, the filtered prediction being determined based on the one or more filters and the one or more predictions.

18. The method of claim 17, wherein:

the one or more template predictions include a template prediction;

the one or more prediction modes include a prediction mode;

the generating the one or more template predictions further comprises:

generating a plurality of candidate template predictions based on a plurality of candidate prediction modes, and determining the template prediction as one of the plurality of candidate template predictions that corresponds to a smallest cost value among cost values between the plurality of candidate template predictions and the template reconstruction of the template;

the deriving the one or more filters for the current block includes deriving a filter based on the template prediction and the template reconstruction of the template;

the determining the one or more predictions of the current block includes determining a prediction of the current block based on the one of the plurality of candidate prediction modes through which the template prediction is determined; and the determining the final prediction of the current block includes applying the filter to the prediction of the current block to generate the final prediction of the current block.

19. The method of claim 17, wherein:

the one or more template predictions include a plurality of template predictions;

the one or more prediction modes include a plurality of prediction modes;

the generating the one or more template predictions further comprises:

generating the plurality of template predictions based on the plurality of prediction modes, and generating a fused template prediction based on the plurality of template predictions;

the deriving the one or more filters for the current block includes deriving a filter based on the fused template prediction and the template reconstruction;

the determining the one or more predictions of the current block further comprises:

generating a plurality of predictions based on the plurality of prediction modes, and generating a fused prediction based on the plurality of predictions; and the determining the final prediction of the current block includes applying the filter to the fused prediction of the current block to generate the final prediction of the current block.

20. A non-transitory computer-readable storage medium storing instructions which, when executed by a processor, cause the processor to perform a method of encoding a bitstream comprising:

generating one or more template predictions for a template of a current block in a current picture based on one or more prediction modes, the template including neighboring samples of the current block, each of the one or more template predictions being generated based on a respective one of the one or more prediction modes;

deriving one or more filters for the current block, each of the one or more filters being derived based on one of (i) filter index information and (ii) a respective one of the one or more template predictions and a template reconstruction of the template;

determining one or more predictions of the current block, each of the one or more predictions being determined based on a respective one of the one or more prediction modes;

determining a final prediction of the current block based on a weighted combination of (i) the one or more predictions and (ii) a filtered prediction, the filtered prediction being determined based on the one or more filters and the one or more predictions;

encoding the final prediction of the current block in the bitstream; and transmitting the encoded bitstream.

* * * * *